(12) United States Patent
Shih

(10) Patent No.: US 8,348,571 B2
(45) Date of Patent: Jan. 8, 2013

(54) SCREW

(75) Inventor: Sheng-Tsai Shih, Kaohsiung County (TW)

(73) Assignee: Bi-Mirth Corp., Gangshan Township, Kaohsiung County (TW)

( * ) Notice: Subject to any disclaimer, the term of this patent is extended or adjusted under 35 U.S.C. 154(b) by 503 days.

(21) Appl. No.: 12/613,844

(22) Filed: Nov. 6, 2009

(65) Prior Publication Data

US 2011/0110745 A1    May 12, 2011

(51) Int. Cl.
*F16B 25/00* (2006.01)

(52) U.S. Cl. .................. 411/386; 411/387.1; 411/387.7; 411/418; 411/424

(58) Field of Classification Search ............ 16/386, 16/387.1, 387.2, 387.6–387.8, 402, 411–413, 16/417–418, 424, 426; 411/386, 387.1, 387.2, 411/387.6–387.8, 402, 411–413, 417–418, 411/424, 426
See application file for complete search history.

(56) References Cited

U.S. PATENT DOCUMENTS

| | | | |
|---|---|---|---|
| 66,766 A * | 7/1867 | Young | 411/418 |
| 924,273 A * | 6/1909 | Rehse | 411/418 |
| 4,844,676 A * | 7/1989 | Adamek | 411/386 |
| 5,044,855 A * | 9/1991 | Fukubayashi | 411/386 |
| 5,516,248 A * | 5/1996 | DeHaitre | 411/387.2 |
| 5,827,030 A * | 10/1998 | Dicke | 411/387.4 |
| 5,897,280 A * | 4/1999 | Dicke | 411/411 |
| 6,015,252 A * | 1/2000 | Peck | 411/387.1 |
| 6,056,491 A * | 5/2000 | Hsu | 411/418 |
| 6,394,726 B1 * | 5/2002 | Garvick | 411/414 |
| 6,789,991 B2 * | 9/2004 | Hsu | 411/387.6 |
| 7,101,133 B2 * | 9/2006 | Dicke | 411/387.4 |
| 2002/0168245 A1 * | 11/2002 | Kuo-Tai | 411/387.1 |
| 2004/0096293 A1 * | 5/2004 | Tadich | 411/387.8 |
| 2007/0036632 A1 * | 2/2007 | Lin | 411/402 |
| 2007/0286701 A1 * | 12/2007 | Hsu | 411/387.1 |
| 2008/0031705 A1 * | 2/2008 | Severns | 411/413 |
| 2008/0273941 A1 * | 11/2008 | Van Cor | 411/426 |

* cited by examiner

Primary Examiner — Roberta Delisle
(74) Attorney, Agent, or Firm — Muncy, Geissler, Olds & Lowe, PLLC

(57) ABSTRACT

A screw has a screw head and a shank. The screw head has a square cavity, a hexagonal cavity or a hexagonal boss to be wedged by a screw driver for wrenching. The shank has a first asymmetrical thread at the taper to facilitate drilling holes, asymmetrical saw-type threads behind the first asymmetrical thread, and a second asymmetrical thread behind the asymmetrical saw-type threads. The shank further has a carved V-shaped tail between the first asymmetrical thread and the asymmetrical saw-type threads to facilitate cutting and debris dispelling. The screw thus formed can rapidly perform thread tapping and debris dispelling, and reduce friction and expand drilling holes and achieve fast fastening.

9 Claims, 7 Drawing Sheets

SCREW

FIELD OF THE INVENTION

The present invention relates to a screw and particularly to a screw capable of tapping and dispelling debris from a working piece and achieving rapid fastening.

BACKGROUND OF THE INVENTION

Screws are indispensable tools widely used with screw drivers. They are also commonly used fastening tools ubiquitously adapted from very small articles to large machineries and buildings, such as ornamental items and vehicles and architectures. They play important roles in the life and work of mankind.

Conventional screws used on wood or building materials generally have a sharp end to bore into an article through the surface thereof and threads tightly wedged in a hole formed by the sharp end to produce an internal thread by fracturing and thrusting the working piece, and then form a tight fastening by wrenching helically.

The threads of the conventional screw usually are formed on the periphery thereof in a symmetrical manner. During drilling process, resistance gradually increases with sinking insertion of the threads. While the resistance takes place during the sharp end sinking and threads thrusting on the working article such as wood or structural material, a friction also occurs while the threads move forwards. In addition, debris and powders generated in the drilling process will also increase the friction. Hence a greater force is needed to perform the drilling process as the screw is sunken deeper.

To facilitate drilling process by using the screw, many automatic tools have been developed. However, these tools make user's discerning the screw conditions more difficult. For instance, it is not easy to detect increase of resistance, and an excessive force could be exerted and result in fracturing of the screw. This causes resource waste or even bouncing away of the screw that could create hazardous conditions to users.

SUMMARY OF THE INVENTION

The primary object of the present invention is to overcome the problems of the conventional screw that require a greater force while the screw is sunken deeper that results in difficult screwing operation and fracturing of the screw by providing a screw to enhance thread drilling effect through mechanics and compound threads to increase drilling and thread tapping efficiency, and also reduce fastening time, and reduce friction through debris dispelling to save screwing time and effort.

To achieve the foregoing object the screw according to the present invention has a shank including a taper and a stem, and a screw head connected with the shank. There is a first asymmetrical thread at the taper with a first front end angle $\alpha$ formed between 30 and 40 degrees, and a first rear end angle $\beta$ formed between 10 and 20 degrees. The stem has asymmetrical saw-type threads and a second asymmetrical thread that are extended sequentially from the first asymmetrical thread towards the screw head. The asymmetrical saw-type threads are spaced by a second threaded pitch that is the same as the first threaded pitch of the first asymmetrical thread. The asymmetrical saw-type thread also has a second front end angle $\alpha'$ formed between 27 and 33 degrees, and a second rear end angle $\beta'$ formed between 7 and 13 degrees to enhance forward drilling and grinding effect while the shank is expanded a hole of a working piece such as woods outwards from the taper to the stem, and also cut fibers of the working piece to facilitate advancing of the shank and thus forms a inner thread insides the working piece. The shank further has a carved V-shaped tail between the first asymmetrical thread and the asymmetrical saw-type threads to accommodate debris and powder generated during hole drilling via the first asymmetrical thread and convey the debris and the powder towards the screw head. The second asymmetrical thread has a third front end angle $\alpha''$ formed between 27 and 33 degrees, and a third rear end angle $\beta''$ formed between 7 and 13 degrees, and also has a third threaded pitch spaced same as the first threaded pitch and the second threaded pitch, and also continuously forms the inner thread drilled and ground by the asymmetrical saw-type threads to facilitate advancing of the shank. The screw of the present invention also can dispel the debris and powders and reduce friction of the shank to save operation time and effort.

In short, the present invention provides many benefits, notably:

1. Asymmetrical and saw type threads are formed on the periphery of the shank to increase drilling and thread tapping efficiency to save operation time.
2. A cutting edge is formed at the carved V-shaped tail end to further enhance drilling efficiency.
3. The threads formed on the screw of the present invention can dispel debris and powders and reduce friction during drilling.

The foregoing, as well as additional objects, features and advantages of the present invention will be more readily apparent from the following detailed description, which proceeds with reference to the accompanying drawings.

DETAILED DESCRIPTION OF THE PREFERRED EMBODIMENTS

Figure 1:
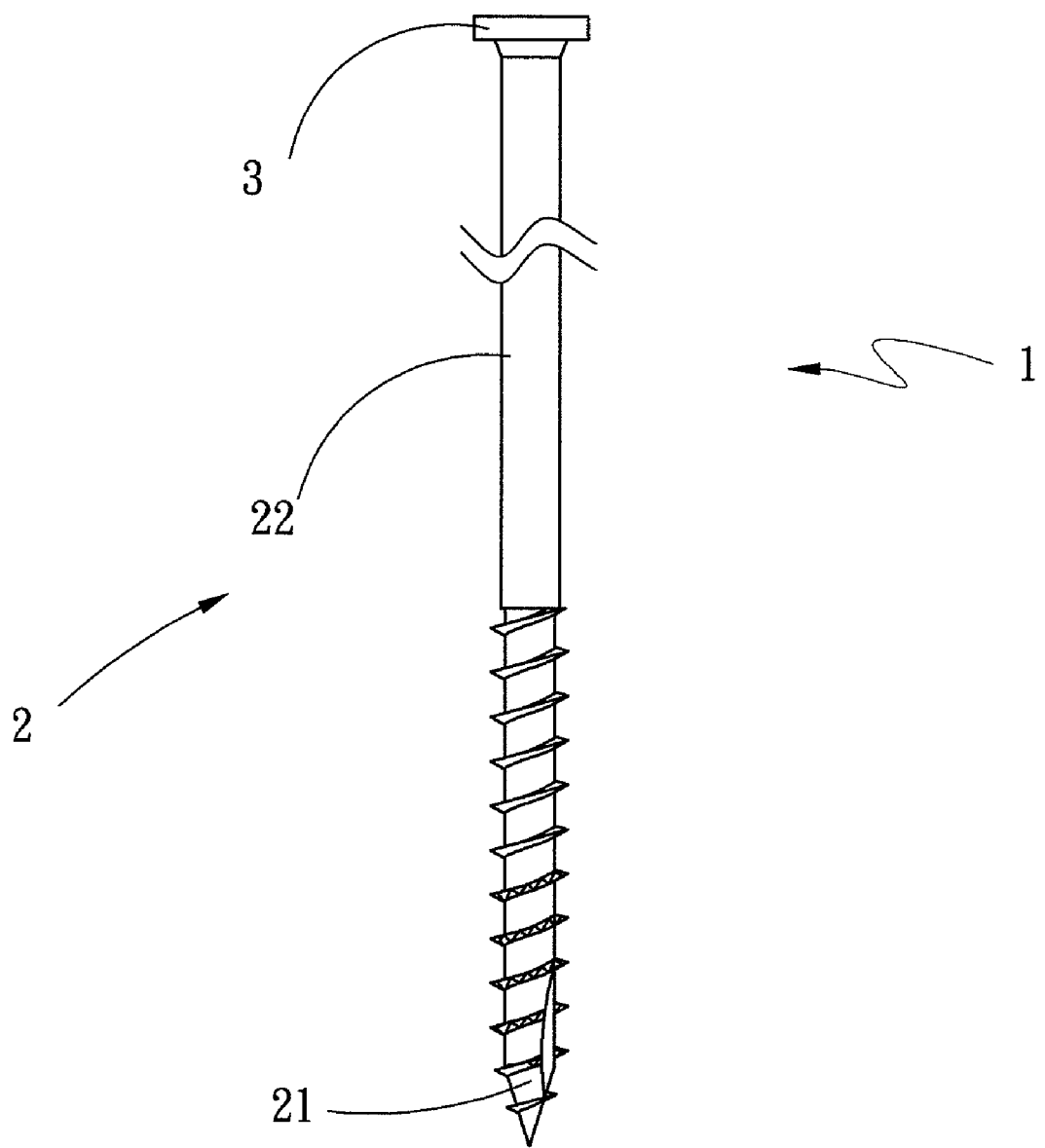
FIG. 1 is a side view of the screw according to the present invention.
Figure 2:
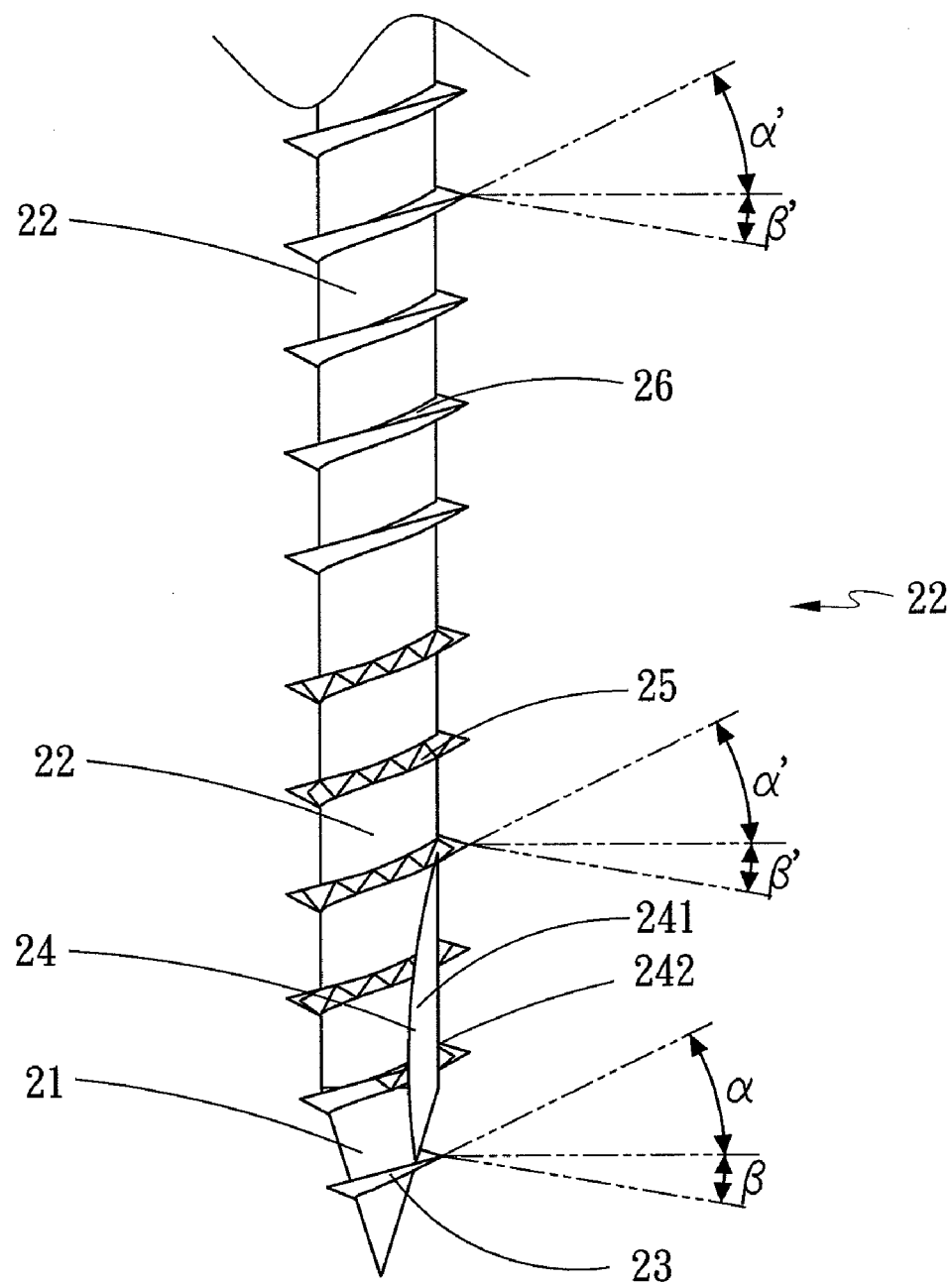
FIG. 2 is a fragmentary enlarged side view of the shank according to the present invention.
Figure 3:
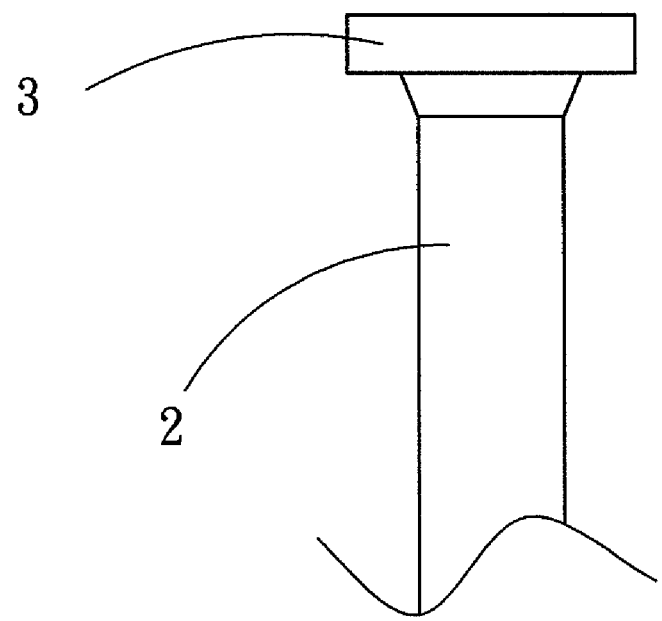
FIG. 3 is an enlarged side view of the screw head according to the present invention.

Please referring to FIGS. 1, 2 and 3, the present invention provides a screw 1 which has a shank 2 and a screw head 3 connected with the shank 2.

The shank 2 includes a taper 21 and a stem 22 that are connected coaxially. There is a first asymmetrical thread 23 at the taper 21 to facilitate drilling holes. The first asymmetrical thread 23 has a first front end angle $\alpha$ formed between 30 and 40 degrees, and a first rear end angle $\beta$ formed between 10 and 20 degrees. The stem 22 has asymmetrical saw-type threads 25 and a second asymmetrical thread 26 that are extended sequentially from the first asymmetrical thread 23 towards the screw head 3. The asymmetrical saw-type thread 25 has a second front end angle $\alpha'$ formed between 27 and 33 degrees, and a second rear end angle $\beta'$ formed between 7 and 13 degrees. The asymmetrical saw-type threads 25 are spaced by a second threaded pitch same as the first threaded pitch of the first asymmetrical thread 23. The shank 1 has a carved V-shaped tail 24 between the first asymmetrical thread 23 and the asymmetrical saw-type threads 25. The carved V-shaped tail 24 is a groove 241 with one edge formed a sharp cutting edge 242 to accommodate the debris and powder generated during hole drilling via the first asymmetrical thread 23 and convey the debris and powder towards the screw head 3. The second asymmetrical thread 26 has a third front end angle α" formed between 27 and 33 degrees, and a third rear end angle β" formed between 7 and 13 degrees. The second asymmetrical thread 26 also has a third threaded pitch the same as the first threaded pitch and the second threaded pitch.

Figure 4:
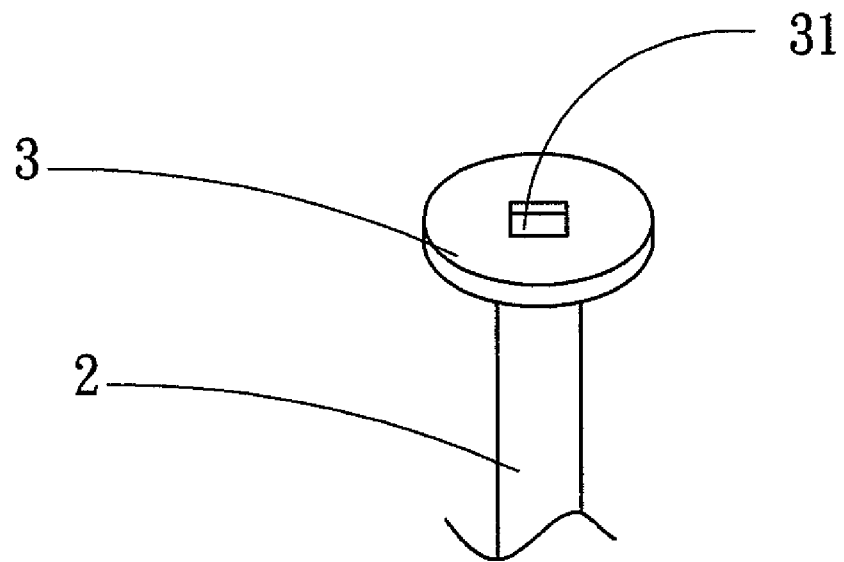
FIG. 4 is a perspective view of the screw head formed with the square cavity according to the present invention.
Figure 5:
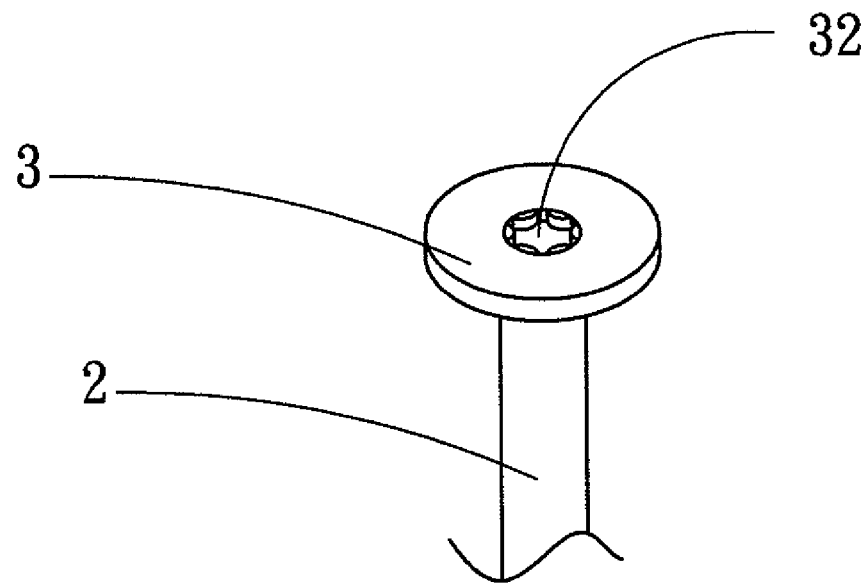
FIG. 5 is a perspective view of the screw head formed with the hexagonal cavity according to the present invention.
Figure 6:
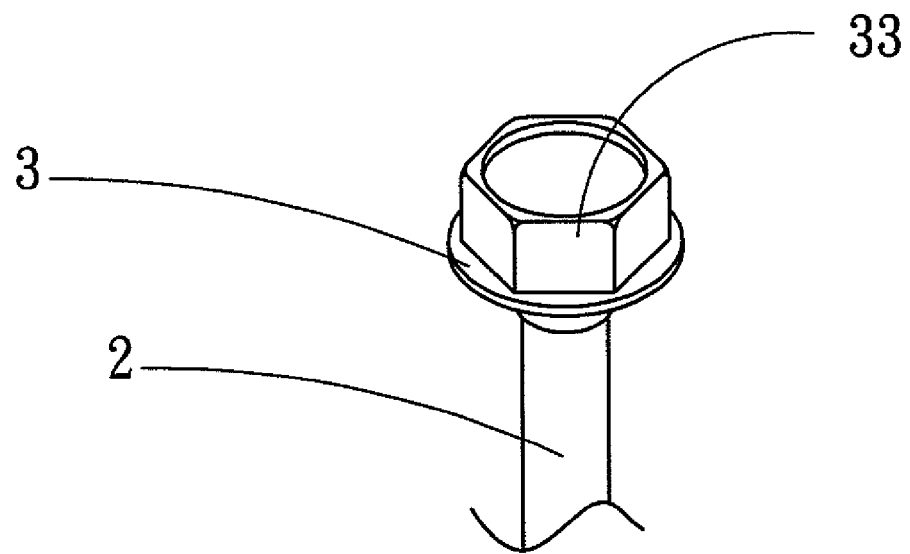
FIG. 6 is a perspective view of the screw head formed with the hexagonal boss according to the present invention.

Also referring to FIGS. 1, 3 and 4, the head 3 is formed with a circular plated shape and extended coaxially from a rear distal end of the shank 2. The screw head 3 has a square cavity 31 at the rear end to be wedged by a corresponding tool for wrenching. The cavity on the screw head 3 may be formed in various types, such as a hexagonal cavity 32 shown in FIG. 5 or a hexagonal boss 33 shown in FIG. 6.

Figure 7:
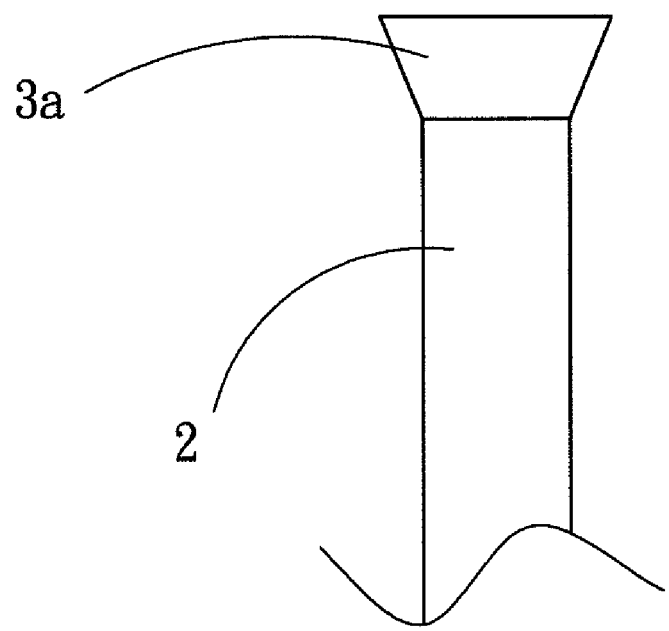
FIG. 7 is an enlarged side view of an embodiment of the screw head according to the present invention.

FIG. 7 illustrates an embodiment in which the screw head 3a is formed in a conical shape connecting to the rear end of the shank 2 and extended coaxially to enhance structural strength.

Referring to FIGS. 1 and 2, when the screw 1 of the present invention is in use, the taper 21 sinks into a working piece to prevent the screw 1 from sliding or moving and thus generates a hole on the working piece; the first asymmetrical thread 23 starts tapping the working piece; the carved V-shaped tail 24 shreds the working piece into debris and powders through the cutting edge 242 and conveys the debris and powders in the groove 241 to be carried towards the screw head 3; while the taper 21 expands the hole of the work piece outwards to reach the stem 22, the saw type thread of the asymmetrical saw-type thread 25 shreds the fibers of the working piece (such as wood) to enhance drilling and grinding effect and further expand the hole and thus forms a inner thread insides the working piece, due to the second threaded pitch of the asymmetrical saw-type thread 25 spaced same as the first threaded pitch of the first asymmetrical thread 23, the shank 2 can be moved forwards at a greater force; then the second asymmetrical thread 26 continuously forms the inner thread generated by drilling and grinding of the asymmetrical saw-type thread 25. Since the third threaded pitch of the second asymmetrical thread 26 spaced same as the first threaded pitch of the first asymmetrical thread 23, the shank 2 can be moved forwards faster to accelerate dispelling of the debris and powders, and reduce friction of the shank 2.

What is claimed is:

1. A screw comprising a shank and a screw head connected with the shank, wherein:

the shank has a taper and a stem connected coaxially, the taper having a first asymmetrical thread to facilitate drilling holes, the stem having asymmetrical saw-type threads and a second asymmetrical thread that are extended sequentially from the first asymmetrical thread towards the screw head, the shank further having a carved V-shaped tail between the first asymmetrical thread and the asymmetrical saw-type threads the V-shaped tail having a length larger than one of the first threaded pitch to form a space to accommodate debris and powder generated during hole drilling via the first asymmetrical thread and convey the debris and the powder towards the screw head.

2. The screw of claim 1, wherein the first asymmetrical thread has a first front end angle formed between 30 and 40 degrees and a first rear end angle formed between 10 and 20 degrees.

3. The screw of claim 1, wherein the carved V-shaped tail has one edge formed as a sharp cutting edge.

4. The screw of claim 1, wherein the asymmetrical saw-type threads have a second front end angle formed between 27 and 33 degrees and a second rear end angle formed between 7 and 13 degrees.

5. The screw of claim 1, wherein the second asymmetrical thread has a third front end angle formed between 27 and 33 degrees and a third rear end angle formed between 7 and 13 degrees.

6. The screw of claim 1, wherein the screw head has a square cavity on a rear end.

7. The screw of claim 1, wherein the screw head has a hexagonal cavity on a rear end.

8. The screw of claim 1, wherein the screw head has a hexagonal boss on a rear end.

9. The screw of claim 1, wherein the screw head is formed in a conical shape.

* * * * *